(12) United States Patent
Tsai et al.

(10) Patent No.: US 9,413,197 B2
(45) Date of Patent: Aug. 9, 2016

(54) INDUCTIVE POWER SUPPLY SYSTEM AND INTRUDING METAL DETECTION METHOD THEREOF

(71) Applicant: Fu Da Tong Technology Co., Ltd., New Taipei (TW)

(72) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 609 days.

(21) Appl. No.: 13/789,694

(22) Filed: Mar. 8, 2013

(65) Prior Publication Data

US 2013/0187476 A1 Jul. 25, 2013

Related U.S. Application Data

(63) Continuation-in-part of application No. 12/898,992, filed on Oct. 6, 2010, now Pat. No. 8,417,359, and a continuation-in-part of application No. 13/237,668, filed on Sep. 20, 2011, now Pat. No. 8,772,979.

(30) Foreign Application Priority Data

| May 31, 2010 | (TW) | ................................ 99117430 A |
| Feb. 1, 2011 | (TW) | .............................. 100103836 A |
| Jul. 8, 2011 | (TW) | .............................. 100124255 A |
| Sep. 20, 2012 | (TW) | .............................. 101134416 A |

(51) Int. Cl.
   *H02J 17/00* (2006.01)
(52) U.S. Cl.
   CPC ...................................... *H02J 17/00* (2013.01)
(58) Field of Classification Search
   None
   See application file for complete search history.

(56) References Cited

U.S. PATENT DOCUMENTS 3,883,249 A * 5/1975 Pryor ................. G01B 11/2433
   356/505
4,628,265 A * 12/1986 Johnson ................. G01V 3/107
   324/225

(Continued)

FOREIGN PATENT DOCUMENTS

| CN | 101252293 A | 8/2008 |
| CN | 101488677 A | 7/2009 |

(Continued)

OTHER PUBLICATIONS

Tan, K.S.; Hinberg, I. and Wadhwani, J., "Electromagnetic Interference in Medical Devices: Health Canada's Past and Current Perspectives and Activities", 2001, IEEE Int. Symp. Electr. Comp. 2, 1283-1288.*

*Primary Examiner* — Mohammad Ali
*Assistant Examiner* — Kelvin Booker
(74) *Attorney, Agent, or Firm* — Winston Hsu; Scott Margo (57) ABSTRACT

The inductive power supply system comprises an input power module for receiving a stable voltage source, a storage module for storing a predetermined information, a processing module for generating a control signal according to the predetermined information and a feedback signal, a driving module for transforming the stable voltage source into a driving voltage according to the control signal, an inductive coil for electrically transmitting the driving voltage to process an inductive power transmission operation, and a feedback module for generating the feedback signal according to the driving voltage received by the inductive coil, where the predetermined information represents an initial state of the inductive power supply system comprising a sinusoidal amplitude corresponding to the driving voltage, and an intruding metal can affect another sinusoidal amplitude of the feedback signal to make the processing module correspondingly generate the control signal during the inductive power transmission operation.

23 Claims, 9 Drawing Sheets

(56) References Cited

U.S. PATENT DOCUMENTS

| | | | | |
|---|---|---|---|---|
| 4,868,504 | A * | 9/1989 | Johnson | G01V 3/104 307/138 |
| 5,004,724 | A * | 4/1991 | De | G01N 27/9033 257/32 |
| 5,027,709 | A * | 7/1991 | Slagle | F42C 13/08 102/293 |
| 5,734,254 | A | 3/1998 | Stephens | |
| 6,265,788 | B1 * | 7/2001 | Davidson | B60R 21/01 307/10.1 |
| 7,109,682 | B2 | 9/2006 | Takagi | |
| 7,791,311 | B2 | 9/2010 | Sagoo | |
| 7,953,369 | B2 | 5/2011 | Baarman | |
| 8,004,235 | B2 | 8/2011 | Baarman | |
| 8,072,310 | B1 | 12/2011 | Everhart | |
| 8,188,619 | B2 | 5/2012 | Azancot | |
| 8,193,764 | B2 | 6/2012 | Jakubowski | |
| 8,217,535 | B2 | 7/2012 | Uchida | |
| 8,217,621 | B2 | 7/2012 | Tsai | |
| 8,417,359 | B2 | 4/2013 | Tsai | |
| 8,508,077 | B2 | 8/2013 | Stevens | |
| 2008/0054905 | A1 * | 3/2008 | Linse | G01V 3/101 324/326 |
| 2008/0065225 | A1 * | 3/2008 | Wasielewski | A61B 5/03 623/18.11 |
| 2008/0079392 | A1 | 4/2008 | Baarman | |
| 2009/0109130 | A1 * | 4/2009 | Murphy | G06F 1/1601 345/31 |
| 2009/0174263 | A1 | 7/2009 | Baarman | |
| 2010/0007307 | A1 | 1/2010 | Baarman | |
| 2010/0156399 | A1 * | 6/2010 | Chiba | A61B 1/00158 324/207.13 |
| 2010/0277003 | A1 | 11/2010 | Von Novak | |
| 2011/0050164 | A1 * | 3/2011 | Partovi | H01F 5/003 320/108 |
| 2011/0199046 | A1 * | 8/2011 | Tsai | H02J 7/025 320/108 |
| 2011/0291489 | A1 | 12/2011 | Tsai | |
| 2012/0007443 | A1 | 1/2012 | Tsai | |
| 2012/0038317 | A1 * | 2/2012 | Miyamoto | H02J 7/025 320/108 |
| 2012/0077537 | A1 * | 3/2012 | Muratov | H04B 5/0037 455/522 |
| 2012/0091989 | A1 * | 4/2012 | Uramoto | H02J 7/025 324/76.11 |
| 2012/0091993 | A1 * | 4/2012 | Uramoto | H02J 7/025 324/105 |
| 2012/0112531 | A1 * | 5/2012 | Kesler | B60L 11/182 307/9.1 |
| 2012/0112532 | A1 * | 5/2012 | Kesler | H03H 7/40 307/9.1 |
| 2012/0112534 | A1 * | 5/2012 | Kesler | B60L 11/1812 307/10.1 |
| 2012/0112536 | A1 * | 5/2012 | Karalis | B60L 11/182 307/10.1 |
| 2012/0112538 | A1 * | 5/2012 | Kesler | B60L 11/182 307/10.1 |
| 2012/0112691 | A1 * | 5/2012 | Kurs | B60L 11/182 320/108 |
| 2012/0119569 | A1 * | 5/2012 | Karalis | B60L 11/1812 307/9.1 |
| 2012/0119575 | A1 * | 5/2012 | Kurs | B60L 3/003 307/10.1 |
| 2012/0119576 | A1 * | 5/2012 | Kesler | B60L 11/182 307/10.1 |
| 2012/0119698 | A1 * | 5/2012 | Karalis | B60L 11/182 320/108 |
| 2012/0146576 | A1 * | 6/2012 | Partovi | H01F 7/0252 320/108 |
| 2012/0153894 | A1 * | 6/2012 | Widmer | H04B 5/0037 320/108 |
| 2012/0161696 | A1 * | 6/2012 | Cook | B60L 11/182 320/108 |
| 2012/0165209 | A1 * | 6/2012 | Martin | C12N 11/00 506/9 |
| 2012/0184338 | A1 * | 7/2012 | Kesler | H02J 17/00 455/572 |
| 2012/0228952 | A1 * | 9/2012 | Hall | H03H 7/40 307/104 |
| 2012/0228953 | A1 * | 9/2012 | Kesler | H03H 7/40 307/104 |
| 2012/0228954 | A1 * | 9/2012 | Kesler | H03H 7/40 307/104 |
| 2012/0235501 | A1 * | 9/2012 | Kesler | H03H 7/40 307/104 |
| 2012/0235502 | A1 * | 9/2012 | Kesler | H03H 7/40 307/104 |
| 2012/0235503 | A1 * | 9/2012 | Kesler | H03H 7/40 307/104 |
| 2012/0235504 | A1 * | 9/2012 | Kesler | H02J 5/005 307/104 |
| 2012/0235566 | A1 * | 9/2012 | Karalis | H03H 7/40 315/70 |
| 2012/0235567 | A1 * | 9/2012 | Karalis | H03H 7/40 315/70 |
| 2012/0235633 | A1 * | 9/2012 | Kesler | H03H 7/40 320/108 |
| 2012/0235634 | A1 * | 9/2012 | Hall | H03H 7/40 320/108 |
| 2012/0239117 | A1 * | 9/2012 | Kesler | H03H 7/40 607/61 |
| 2012/0242159 | A1 * | 9/2012 | Lou | H03H 7/40 307/104 |
| 2012/0242225 | A1 * | 9/2012 | Karalis | H03H 7/40 315/70 |
| 2012/0248886 | A1 * | 10/2012 | Kesler | H03H 7/40 307/104 |
| 2012/0248887 | A1 * | 10/2012 | Kesler | H03H 7/40 307/104 |
| 2012/0248888 | A1 * | 10/2012 | Kesler | H03H 7/40 307/104 |
| 2012/0248981 | A1 * | 10/2012 | Karalis | H03H 7/40 315/70 |
| 2012/0256494 | A1 * | 10/2012 | Kesler | H03H 7/40 307/104 |
| 2012/0262002 | A1 * | 10/2012 | Widmer | H04B 5/0037 307/104 |
| 2012/0272076 | A1 | 10/2012 | Tsai | |
| 2013/0015705 | A1 * | 1/2013 | Abe | H02J 5/005 307/29 |
| 2013/0027078 | A1 * | 1/2013 | Nakano | H02J 5/005 324/764.01 |
| 2013/0063550 | A1 * | 3/2013 | Ritchey | G03B 37/00 348/36 |
| 2013/0159021 | A1 * | 6/2013 | Felsher | G06F 19/322 705/3 |
| 2013/0162204 | A1 | 6/2013 | Jung | |
| 2013/0176023 | A1 | 7/2013 | Komiyama | |
| 2013/0187476 | A1 * | 7/2013 | Tsai | H02J 17/00 307/104 |
| 2014/0024919 | A1 | 1/2014 | Metzenthen | |
| 2014/0152251 | A1 | 6/2014 | Kim | |
| 2014/0266036 | A1 * | 9/2014 | Jung | G01R 29/0814 320/108 |
| 2015/0008756 | A1 | 1/2015 | Lee | |
| 2015/0028875 | A1 * | 1/2015 | Irie | G01V 3/10 324/345 |
| 2015/0236546 | A1 * | 8/2015 | Kesler | H02J 7/025 455/573 |
| 2015/0255994 | A1 * | 9/2015 | Kesler | B60L 11/182 307/10.1 |

FOREIGN PATENT DOCUMENTS

| | | |
|---|---|---|
| CN | 101584098 A | 11/2009 |
| CN | 100589304 C | 2/2010 |
| CN | 201656503 U | 11/2010 |
| CN | 103248130 A | 8/2013 |
| CN | 103424133 A | 12/2013 |
| CN | 103425169 A | 12/2013 |
| CN | 103595144 A | 2/2014 |
| EP | 2608419 A2 | 6/2013 |
| EP | 2 793 355 A1 | 10/2014 |
| TW | 201001867 | 1/2010 |

(56) References Cited

FOREIGN PATENT DOCUMENTS

| | | |
|---|---|---|
| TW | 201123676 | 7/2011 |
| TW | I389416 | 3/2013 |
| TW | I408861 | 9/2013 |
| TW | 201414130 | 4/2014 |
| TW | 201415752 | 4/2014 |
| TW | 201417445 A | 5/2014 |
| TW | 201440368 A | 10/2014 |
| TW | I472897 | 2/2015 |

* cited by examiner

INDUCTIVE POWER SUPPLY SYSTEM AND INTRUDING METAL DETECTION METHOD THEREOF

CROSS REFERENCE TO RELATED APPLICATIONS

This application is a continuation-in-part of U.S. application Ser. No. 12/898,992, filed on Oct. 6, 2010, entitled "Power transmission method of high-power wireless induction power supply system" and Ser. No. 13/237,668, filed on Sep. 20, 2011, entitled "Method for power self-regulation in a high-power induction type power source", the contents of which are incorporated herein in their entirety.

BACKGROUND OF THE INVENTION

1. Field of the Invention

The present invention relates to an inductive power supply system and an intruding metal detection method thereof, and more particularly, to an inductive power supply system and an intruding metal detection method thereof for simultaneously processing an inductive power transmission operation and detecting whether an intruding metal exists.

2. Description of the Prior Art

In the prior art, an important issue for an inductive power transmission system is to adaptively recognize whether a chargeable device is disposed nearby a transmission coil for an inductive power transmission operation, which is similar to the principle of the induction cooker to generate high-power electromagnetic energy for the inductive power transmission operation. During the operation, when the high-power electromagnetic energy is received by an intruding metal, the intruding metal is heated extra dangerously. In such circumstances, producers developing the inductive power transmission operation have dedicated research into the induction technique with capable object-recognition. Generally, an inductive coil utilized to set up a wireless signal transmission operation between a power receipt end and a power transmission end has been adopted, so as to utilize a receipt coil of the power receipt end to return information signals and utilize a transmission coil of the power transmission end for receiving the information signals. Thus, a relatively effective wireless transmission has been developed for the inductive power transmission operation as well as the wireless signal transmission operation between the power receipt end and the power transmission end.

However, when the producers want to simultaneously process the inductive power transmission operation and the wireless signal transmission operation, both operations are easily interfered with by surrounding signals since the inductive power transmission operation utilizes a relatively high-power carrier wave for transmission, which results in difficulty of operating the wireless signal transmission operation. Alternatively, combination of another solution of wireless signal transmission, such as infrared, blue tooth, RFID or WiFi, and the original inductive power transmission operation has been provided as well. Nevertheless, additional wireless transmission modules are installed to increase production cost, and accordingly, lowers the consumers' popularity. Therefore, the popularity still tends to choose the inductive coil with higher efficient transmission mechanism to process the inductive power transmission operation as well as the wireless signal transmission process.

Noticeably, during processing the inductive power transmission operation as well as the wireless signal transmission operation, a detection signal is utilized for the receipt power end to correctly recognize the chargeable device, so as to process the inductive power transmission operation. In other words, when the user disposes an intruding metal, such as coins, keys or paper clips, which cannot return the wireless information signals, the transmission power end will not process the inductive power transmission operation after transmitting the detection signal with no correspondingly receipt from the receipt power end, so as to avoid the danger of heating the intruding metal. However, the above operation has another potential problem. When the transmission power end detects existence of the chargeable device and there is also an intruding metal partially blocking an interaction area between the transmission coil and the receipt coil, the transmission power end and the receipt power end still utilize the other area without blocking for the wireless signal transmission operation, such that the intruding metal will receive partial electromagnetic energy to be heated dangerously.

For the above problems, the Taiwan patent publication No. 201143250 "Input parasitic metal detection" has disclosed a solution, which analyzes a power consumption value between an input power of the transmission power end and an output power of the receipt power end, so as to determine whether an extra power consumption value happens and correspondingly stops the inductive power transmission operation for safe concerns. However, the extra power consumption value has other possible contributions rather than the intruding metal. For example, a relative position shift between the transmission coil and the receipt coil can cause the occurrence of the extra power consumption value. Therefore, the prior art has to predetermine relative extra power consumption information related to the transmission/receipt coil or other power conversion elements. Alternatively, the user can thoroughly measure the power consumption information caused by intruding metal interacting with all the power conversion elements, and accordingly, take the premeasured power consumption information into the practical operation as the comparison. However, the premeasured power consumption information is highly related to driving voltages, characteristics or detail specs of the power conversion elements. If the user changes one of the power conversion elements, the corresponding parameters need to be reset without flexibility, which seems to be hard for practical determination of the existence of the intruding metal. Besides, relative detection circuits are needed to be installed at the transmission power end and the receipt power end, so as to accurately measure passing current/voltage changes of the transmission/receipt power end for the power consumption information. However, the relative detection circuits have their limitation to obtain the practical changes of the power consumption information, and one more wireless transmission operation is necessary for the power receipt end to transmit the measured current/voltage changes back to the transmission power end for following calculations, which may result in potential errors in determination of the existence of the intruding metal.

Therefore, it has become an important issue to provide an inductive power supply system and an intruding metal detection method thereof for simultaneously processing an inductive power transmission operation and detecting whether an intruding metal exists.

SUMMARY OF THE INVENTION

It is therefore an objective of the invention to provide an inductive power supply system and an intruding metal detection method thereof for simultaneously processing an inductive power transmission operation and detecting whether an intruding metal exists.

The present invention discloses an inductive power supply system, utilized for processing an inductive power transmission operation and detecting whether an intruding metal exists inside the inductive power supply system. The inductive power supply system comprises an input power module for receiving a stable voltage source, a storage module for storing a predetermined information, a processing module coupled to the input power module and the storage module for generating a control signal according to the predetermined information and a feedback signal, a driving module coupled to the input power module and the processing module for transforming the stable voltage source into a driving voltage according to the control signal, an inductive coil coupled to the driving module for electrically transmitting the driving voltage to a receipt power device, so as to process the inductive power transmission operation, and a feedback module coupled to the inductive coil for generating the feedback signal according to the driving voltage received by the inductive coil, wherein the predetermined information represents an initial state of the inductive power supply system comprising a sinusoidal amplitude corresponding to the driving voltage, and the intruding metal can affect another sinusoidal amplitude of the feedback signal to make the processing module correspondingly generate the control signal during the inductive power transmission operation.

The present invention discloses another method for an inductive power supply system, which comprises a processing module, an inductive coil and a predetermined information for processing an inductive power transmission operation and detecting whether an intruding metal exists inside the inductive power supply system. The method comprises switching the inductive power supply system between a setting operation or the inductive power transmission operation according to a control signal, and when the inductive power supply system processes the setting operation, the processing module processes a first operation process, and when the inductive power supply system processes the inductive power transmission operation, the processing module processes a second operation process, wherein the predetermined information is an initial state of the inductive power supply system to be formed as a initial look-up table, the first operation process modifies the initial look-up table of the inductive power supply system to be formed as an adjusted look-up table, and the second operation process detects whether the intruding metal exists in the inductive power supply system according to the adjusted look-up table.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
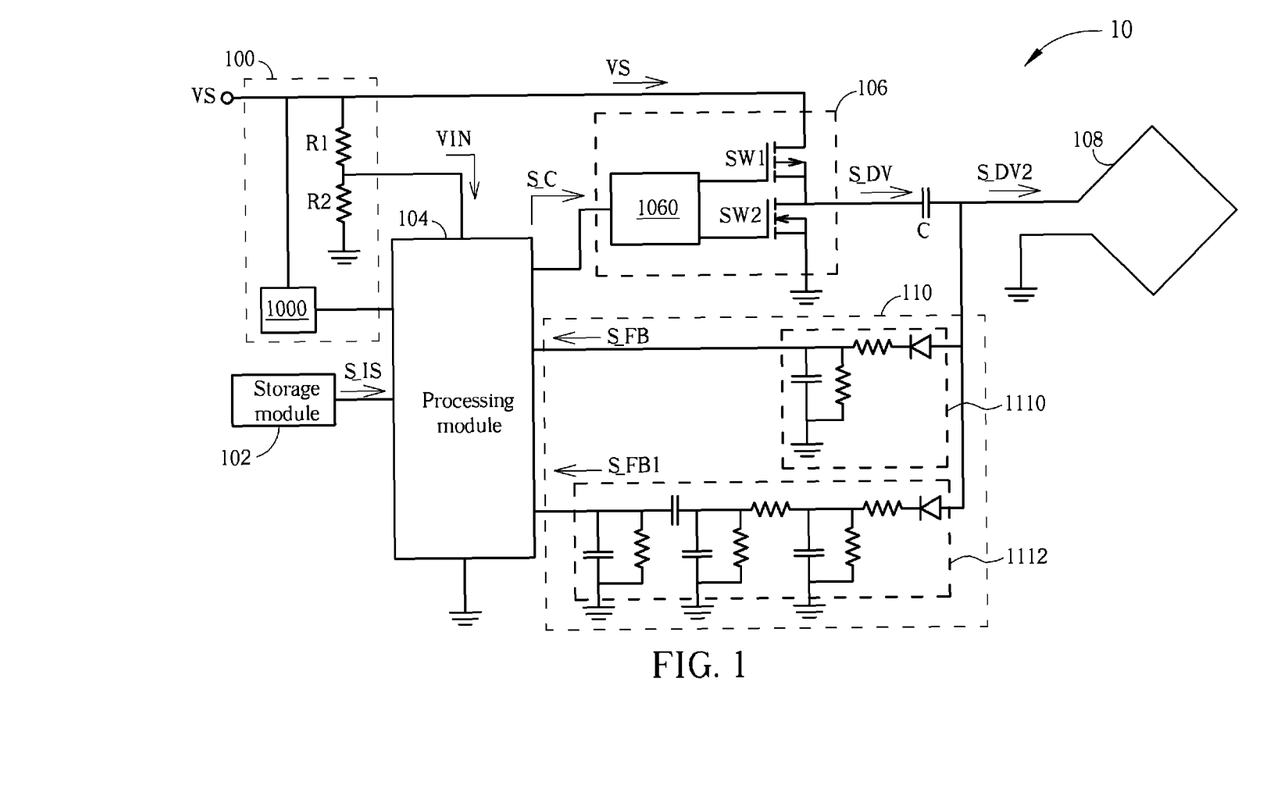
FIG. 1 illustrates a schematic diagram of an inductive power supply system according to an embodiment of the invention.

Please refer to FIG. 1, which illustrates a schematic diagram of an inductive power supply system 10 according to an embodiment of the invention. As shown in FIG. 1, the inductive power supply system 10 comprises an input power module 100, a storage module 102, a processing module 104, a driving module 106, an inductive coil 108 and a feedback module 110. In details, the input power module 100 is coupled to the processing module 104 and the driving module 106 for receiving a stable voltage source VS. Through resistors R1, R2 with a voltage division operation, the stable voltage source VS is transformed into a lower voltage VIN to be transmitted to the processing module 104 for the following process. The driving module 106 directly receives the stable voltage source VS. In the meanwhile, a receipt unit 1000 of the input power module 100 also transmits the stable voltage source VS to the processing module 104 as a power source. The storage module 102 includes an initial state S_IS, and the initial state S_IS represents a plurality of predetermined parameters before the inductive power supply system 10 processes an inductive power transmission operation. The processing module 104 is coupled to the storage module 102 and the feedback module 110 for receiving the plurality of predetermined parameters of the initial state S_IS and a feedback signal S_FB generated from the feedback module 110, so as to generate a control signal S_C to the driving module 106. A driving unit 1060 of the driving module 106 is utilized to receive the control signal S_C to correspondingly turn on/off switch transistors SW1, SW2, so as to transform the stable voltage source VS into a driving voltage S_DV. Next, a capacitor C transforms the driving voltage S_DV into a sinusoidal wave S_DV2 to the inductive coil 108 for processing an electromagnetic transmission, which can be a main carrier wave to transmit the electromagnetic energy and to receive feedback information signals from a receipt power end (not shown in the figure). Preferably, the inductive coil 108 further comprises an effective inductance, which utilizes the electromagnetic transmission to transmit the driving voltage S_DV (or precisely the sinusoidal wave S_DV2) to the receipt power end, such as a chargeable device, for processing the inductive power transmission operation between the chargeable device and the inductive power supply system 10. The feedback module 110 is coupled to the inductive coil 108 and comprises a first detection unit 1110 and a second detection unit 1112. The first detection unit 1110 detects changes of a sinusoidal wave corresponding to the driving voltage S_DV, so as to transform the changes into the feedback signal S_FB to be transmitted to the processing module 104. The second detection unit 1112 detects another feedback information signal from the receipt power end to be transformed into another feedback signal S_FB1 to the processing module 104 as well.

In detail, the feedback signal S_FB represents a voltage signal of the sinusoidal wave S_DV2, and the feedback signal S_FB1 represents the feedback information signal from the receipt power end.

In simple, in the embodiment, the inductive power supply system 10 can determine whether the intruding metal exists therein according to the changes of the sinusoidal wave S_DV2 corresponding to the stable voltage source VS. In that, the storage module 102 of the embodiment pre-stores an initial sinusoidal amplitude corresponding to the driving wave S_DV as the initial state S_IS when the inductive power supply system 10 is operating without electrical connection to any chargeable devices. During operating the inductive power transmission operation between the inductive power supply system 10 and the chargeable device, the feedback module 110 transforms the sinusoidal wave S_DV2 corresponding to the current stable voltage source VS into the feedback signal S_FB, and the processing module 104 compares sinusoidal amplitude differences between the initial state S_IS and the feedback signal S_FB, so as to determine whether the inductive power supply system 10 operates the inductive power transmission operation.

Figure 2:
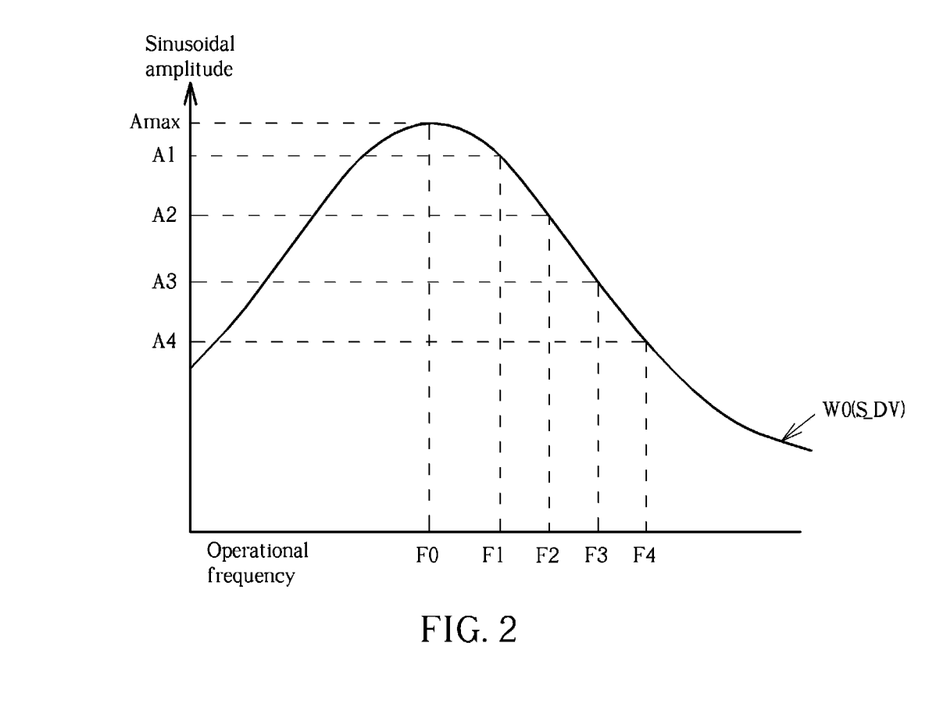
FIG. 2 illustrates a schematic diagram of an amplitude curve correspondingly generated by the capacitor and the inductive coil according to an embodiment of the invention.

Please refer to FIG. 2, which illustrates a schematic diagram of an amplitude curve correspondingly generated by the capacitor C and the inductive coil 108 according to an embodiment of the invention. The amplitude curve is depicted in a two dimensional coordinate system which utilizes a plurality of operational frequencies as the X-axis and a plurality of sinusoidal amplitudes as the Y-axis. The capacitor C and the inductive coil 108 can be effectively regarded as the combination of an inductive capacitor and an inductive inductor comprising the effective capacitance and the effective inductance. After the input power module 100 receives the stable voltage source VS to make the driving module 106 generate the sinusoidal wave S_DV2 via the capacitor C, an amplitude curve W0 corresponding to the inductive coil 108 is depicted on the two dimensional coordinate system via a capacitor-inductor matching. The amplitude curve W0 comprises a maximum sinusoidal amplitude Amax to correspond to an operational frequency F0. For the convenience, the user generally chooses operational frequencies larger than the operational frequency F0 along the amplitude curve W0, so as to avoid generation of the maximum sinusoidal amplitude Amax which can damage the inductive power supply system 10 by overloading the inductive power supply system 10. For example, the user can arbitrarily choose one of the operational frequencies F1, F2, F3 and F4, as shown in FIG. 2, which correspond to the sinusoidal amplitudes A1, A2, A3 and A4, respectively.

Figure 3:
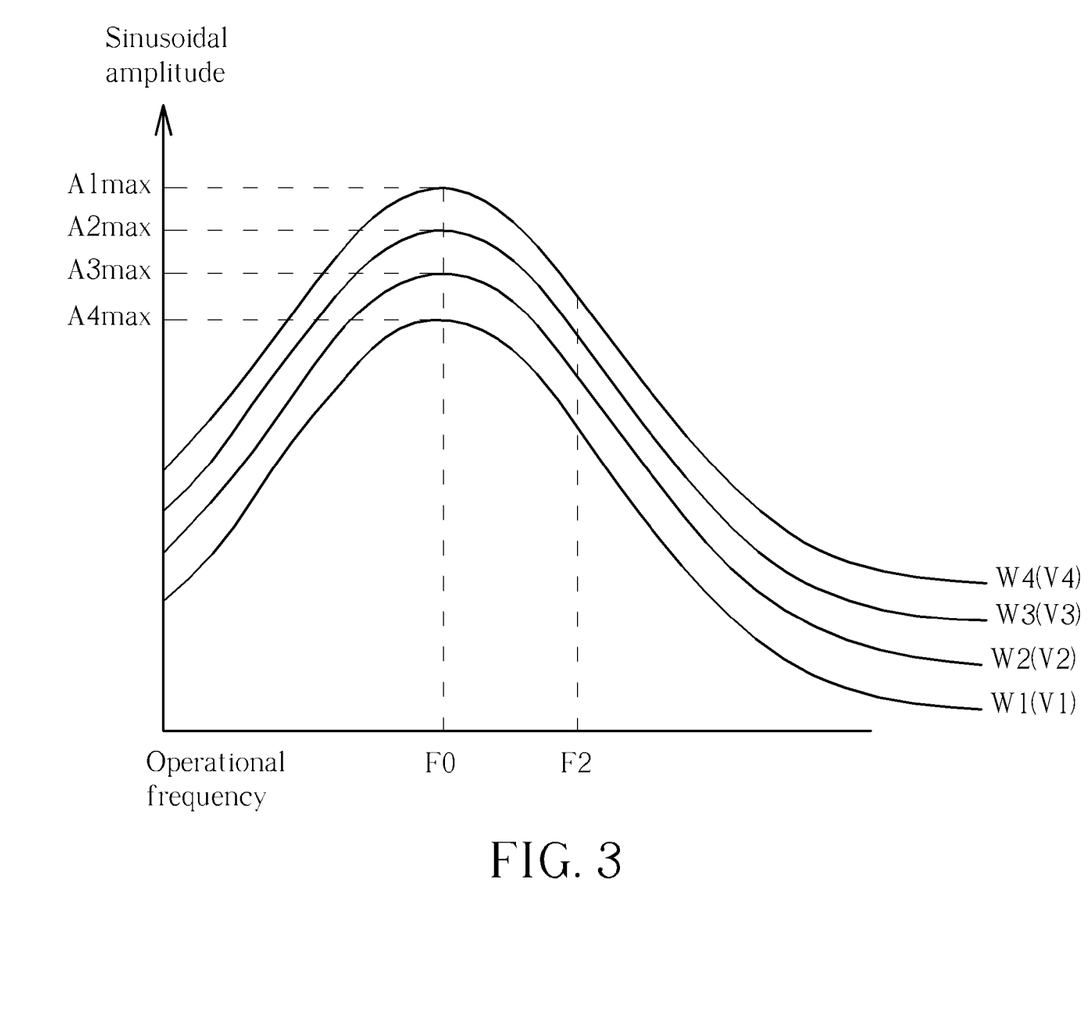
FIG. 3 illustrates a schematic diagram of different amplitude curves correspondingly generated by the capacitor and the inductive coil with different stable voltage sources resulting in different driving voltages according to an embodiment of the invention.

Please refer to FIG. 3, which illustrates a schematic diagram of different amplitude curves W1-W4 correspondingly generated by the capacitor C and the inductive coil 108 with different stable voltage sources resulting in different driving voltages V1-V4 according to an embodiment of the invention. Also, the driving voltages V1-V4 form an incremental series. As shown in FIG. 3, when the driving voltage increases from V1 to V4, the amplitude curve changes from W1 to W4 to correspondingly have maximum sinusoidal amplitudes A1max-A4max at the operational frequency F0. The maximum sinusoidal amplitudes A1max-A4max also increase to shift upward along the Y-axis. While operating at one of the different operational frequencies, such as at the operational frequency F2, the similar incremental circumstance of the maximum sinusoidal amplitudes A1max-A4max can meet as well. Under such circumstances, the embodiment of the invention obtains different sinusoidal amplitude values at different amplitude curves W1-W4 according to different stable voltage sources and different operational frequencies, so as to form a look-up table stored in the storage module 102. Preferably, the storage module 102 can be realized via a non-volatile memory (NVRAM), such as the EEPROM, to correspondingly store the look-up table.

Figure 4:
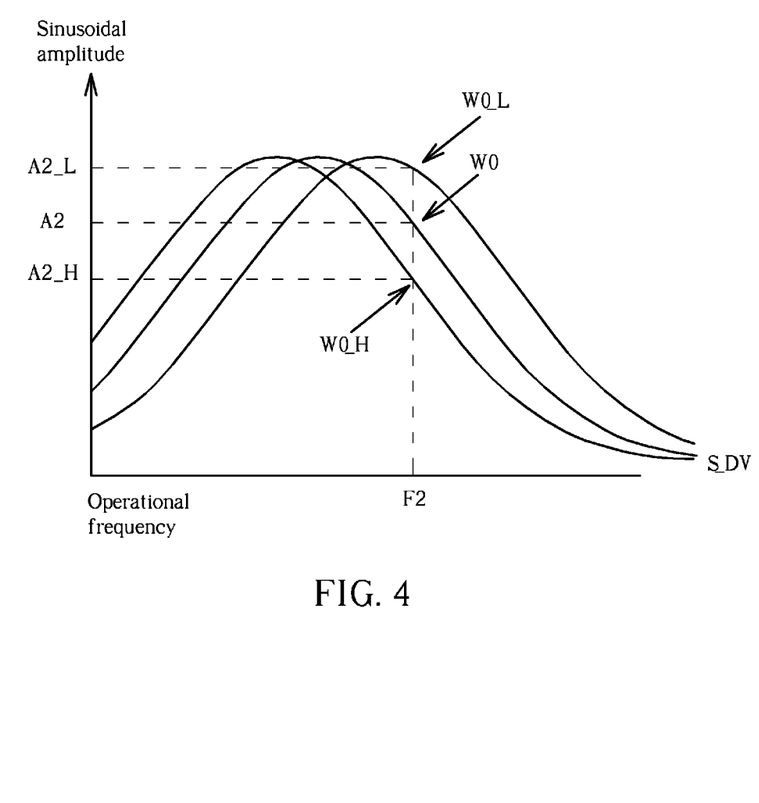
FIG. 4 illustrates a schematic diagram of changes of the amplitude curve corresponding to different effective capacitances/inductances of the capacitor and the inductive coil according to an embodiment of the invention.

Please refer to FIG. 4, which illustrates a schematic diagram of changes of the amplitude curve corresponding to different effective capacitances/inductances of the capacitor C and the inductive coil 108 according to an embodiment of the invention. As shown in FIG. 4, the embodiment hereinafter is similar to the embodiment shown in FIG. 2, and the inductive coil 108 is operated at the driving voltage S_DV to have the sinusoidal amplitude A2 with the operational frequency F2 along the amplitude curve W0. When the effective capacitance of the capacitor C as well as the effective inductance of the inductive coil 108 increase, another amplitude curve W0_H is correspondingly formed, wherein the amplitude curve W0_H can be regarded as a left shift of the amplitude curve W0. Observing at the operational frequency F2, a sinusoidal amplitude A2_H along the amplitude curve W0_H is obtained and is smaller than the sinusoidal amplitude A2. On the other hand, when the effective capacitance of the capacitor C as well as the effective inductance of the inductive coil 108 decrease, another amplitude curve W0_L is correspondingly formed, wherein the amplitude curve W0_L can also be regarded as a right shift of the amplitude curve W0. Observing at the operational frequency F2, a sinusoidal amplitude A2_L along the amplitude curve W0_L is obtained and is larger than the sinusoidal amplitude A2. Noticeably, if the intruding metal exists between the inductive power supply system 10 and the chargeable device at the receipt power end, i.e. the intruding metal is onto a projective plane of the inductive coil 108 interacting with the chargeable device, and does not totally block an interacting area for the inductive power transmission operation and the wireless signal transmission operation, the intruding metal will partially absorb the electromagnetic energy to effectively reduce the effective inductance and to render the larger sinusoidal amplitude. Therefore, the embodiment of the invention can determine whether the intruding metal exists between the inductive power supply system 10 and the chargeable device according to the changes of the sinusoidal amplitude corresponding to the inductive coil 108, so as to determine whether the inductive power supply system 10 operates the inductive power transmission operation.

Preferably, the embodiment of the invention can also be utilized in the situation that the inductive power supply system 10 does not electrically connect to any chargeable devices, and the first detection unit 1110 of the feedback module 110 can directly detect the changes of the sinusoidal wave S_DV2, so as to determine whether the intruding metal enters into an operational range of the inductive power transmission operation, which is also in the scope of the invention.

Figure 5:
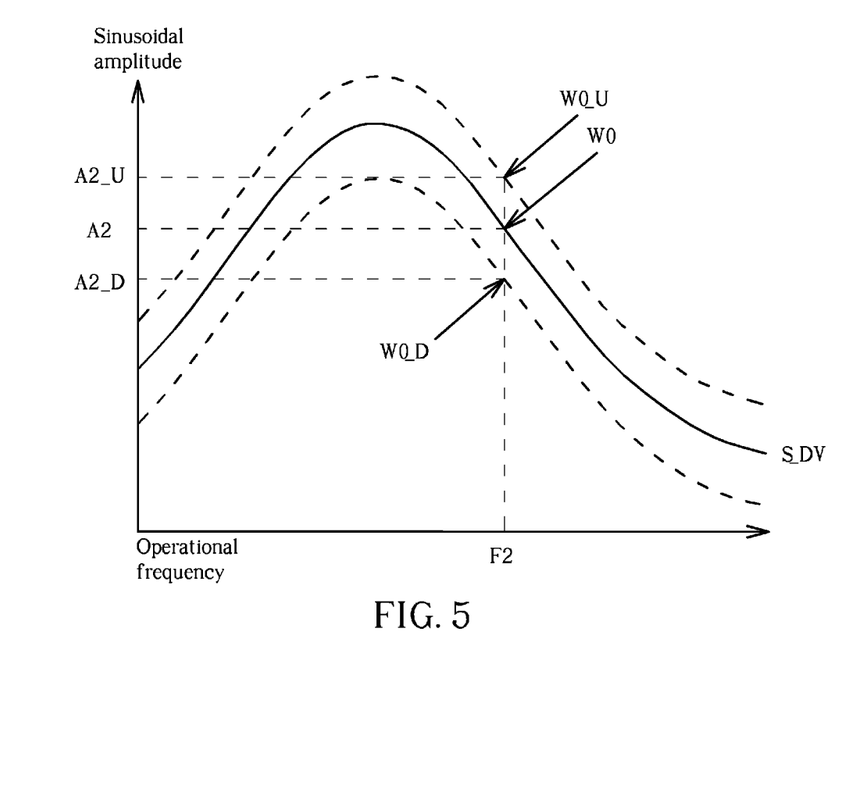
FIG. 5 illustrates a schematic diagram of an amplitude curve predetermined an error range of the inductive coil according to an embodiment of the invention.

Please refer to FIG. 5, which illustrates a schematic diagram of an amplitude curve predetermined an error range of the inductive coil 108 according to an embodiment of the invention. As shown in FIG. 5, the embodiment hereinafter is similar to the embodiment shown in FIG. 2, which operates the inductive coil 108 at the driving voltage S_DV to have the sinusoidal amplitude A2 with the operational frequency F2 along the amplitude curve W0. According to different predetermined conditions set by the user, the amplitude curve W0 can shift upward or downward to form an upper bound amplitude curve W0_U or a lower bound amplitude curve W0_D, respectively, which can have an upper bound sinusoidal amplitude A2_U and a lower bound sinusoidal amplitude A2_D. Under such circumstances, the upper bound sinusoidal amplitude A2_U and the lower bound sinusoidal amplitude A2_D form the error range for the amplitude curve W0 at the operational frequency F2. Accordingly, during the inductive power transmission operation, the inductive power supply system 10 can determine whether the sinusoidal amplitude changes corresponding to the inductive coil 108 exceed the error range, i.e. whether the sinusoidal amplitude is larger than the upper bound sinusoidal amplitude A2_U or smaller than the lower bound sinusoidal amplitude A2_D, to determine whether the intruding metal exists between the inductive power supply system 10 and the chargeable device, so as to operate the inductive power transmission operation or not. Further, the embodiment can combine the mentioned error range with the look-up table of the embodiment shown in FIG. 3, so as to apply to different amplitude curves, different operational frequencies and different stable voltage sources to obtain a plurality of error ranges stored in the NVRAM of the storage module 102 for determination of operating the inductive power transmission operation.

Please refer to the embodiments shown from FIG. 1 to FIG. 5. The inductive power supply system 10 of the invention utilizes the storage module 102 to pre-store the combination of the look-up table shown in FIG. 3 and FIG. 5 to be an error range look-up table, which renders the plurality of error ranges corresponding to different amplitude curves, different operational frequencies and different stable voltage sources. Accordingly, the error range look-up table can be utilized to represent the initial state S_IS corresponding to the particular stable voltage source VS while the inductive power supply system 10 electrically connects with the chargeable device. Then, the feedback module 110 detects the voltage signal of the sinusoidal wave S_DV2 of the inductive coil 108 to be transformed into the feedback signal S_FB, and the processing module 104 compares the sinusoidal amplitude differences between the initial status S_IS and the feedback signal S_FB, so as to determine whether the inductive power supply system 10 operates the inductive power transmission operation.

Figure 6:
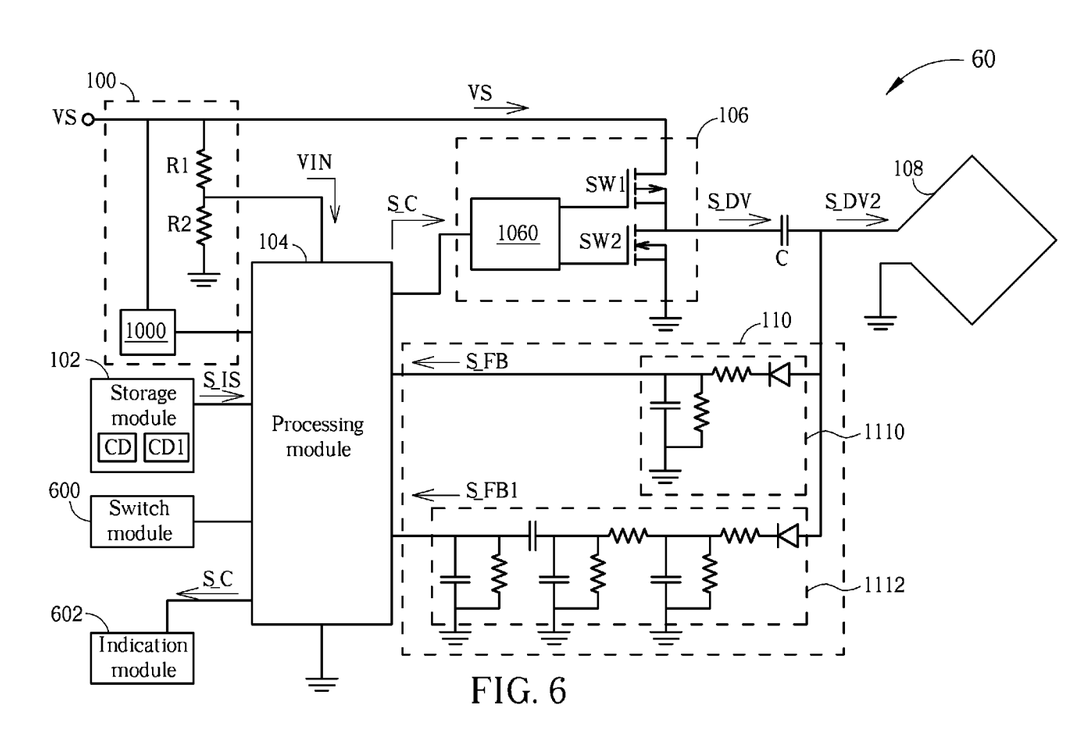
FIG. 6 illustrates a schematic diagram of another inductive power supply system according to an embodiment of the invention.

Please refer to FIG. 6, which illustrates a schematic diagram of another inductive power supply system 60 according to an embodiment of the invention. As shown in FIG. 6, the processing module 104 is further coupled to a switch module 600 and an indication module 602, and the storage module 102 further stores a programming code CD to control the processing module 104 for running the programming code CD via a frequency modulation process, so as to obtain related parameters of the initial operational frequency/voltage of the inductive coil 108 of the inductive power supply system 60. Thus, an initial look-up table is formed comprising the initial status S_IS of the inductive power supply system 60, and details of the frequency modulation process can be understood from the U.S. patent application with Publication No. US 2011/0291489 and the title "Power transmission method of high-power wireless induction power supply system", which is not described hereinafter. Additionally, the storage further comprises another programming code CD1 to be run by the processing module 104 for determining whether the inductive power supply system 60 operates a setting operation or the inductive power transmission operation. In the embodiment, a switch mechanism for the setting operation and the inductive power transmission operation can be pre-stored in the processing module 104 or the storage module 102, so as to control the processing module 104 for processing either one of the operations. Certainly, the mentioned switch mechanism can also be realized via the switch module 600 to correspondingly receive a control signal (not shown in the figure) from the user, so as to control the processing module 104 for operating either the setting operation of the inductive power transmission operation, which is also in the scope of the invention.

Figure 7:
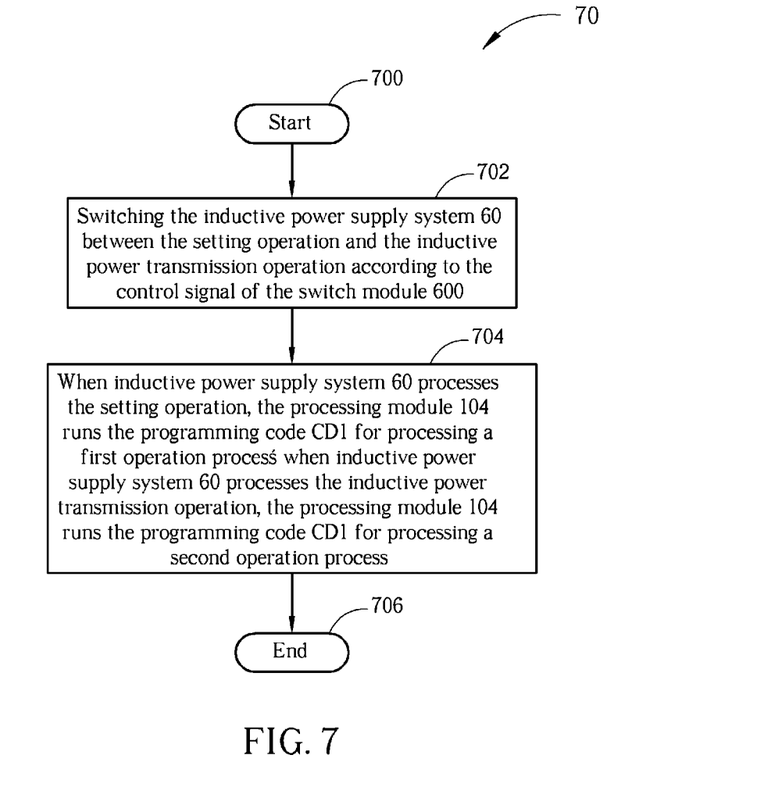
FIG. 7 illustrates a flow chart of a switch process according to an embodiment of the invention.

Further, the switch mechanism of the invention applied to the inductive power supply system 60 can be summarized as a switch process 70, as shown in FIG. 7. The switch process 70 includes the steps as follows.

Step 700: Start.

Step 702: Switching the inductive power supply system 60 between the setting operation and the inductive power transmission operation according to the control signal of the switch module 600.

Step 704: When inductive power supply system 60 processes the setting operation, the processing module 104 runs the programming code CD1 for processing a first operation process; when inductive power supply system 60 processes the inductive power transmission operation, the processing module 104 runs the programming code CD1 for processing a second operation process.

Step 706: End.

Figure 8:
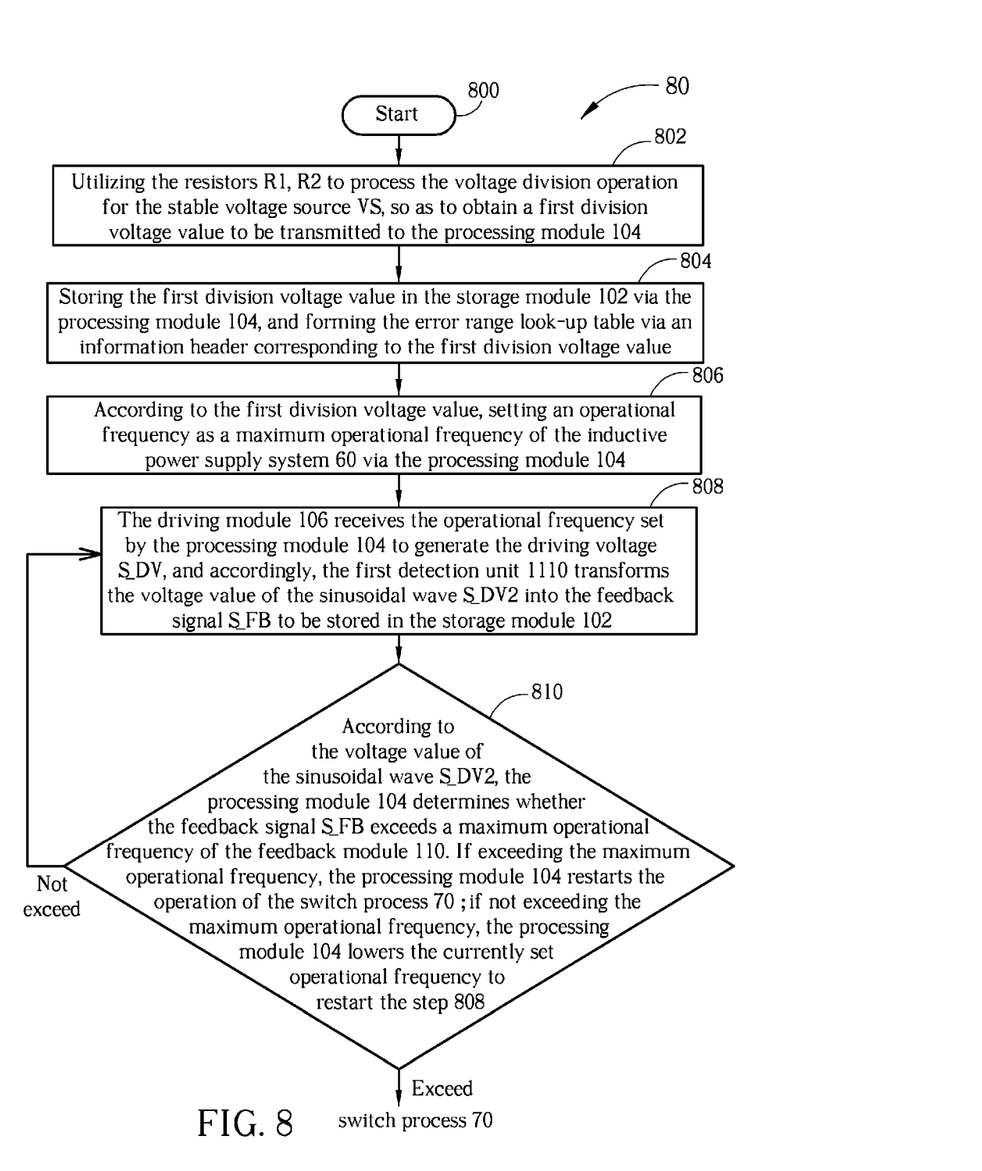
FIG. 8 illustrates a flow chart of a first operation process according to an embodiment of the invention.

In addition, details of the first operation process 80 in Step 704 can also be referenced in FIG. 8. The first operation process 80 includes the steps as follows.

Step 800: Start.

Step 802: Utilizing the resistors R1, R2 to process the voltage division operation for the stable voltage source VS, so as to obtain a first division voltage value to be transmitted to the processing module 104.

Step 804: Storing the first division voltage value in the storage module 102 via the processing module 104, and forming the error range look-up table via an information header corresponding to the first division voltage value.

Step 806: According to the first division voltage value, setting an operational frequency as a maximum operational frequency of the inductive power supply system 60 via the processing module 104.

Step 808: The driving module 106 receives the operational frequency set by the processing module 104 to generate the driving voltage S_DV, and accordingly, the first detection unit 1110 transforms the voltage value of the sinusoidal wave S_DV2 into the feedback signal S_FB to be stored in the storage module 102.

Step 810: According to the voltage value of the sinusoidal wave S_DV2, the processing module 104 determines whether the feedback signal S_FB exceeds a maximum operational frequency of the feedback module 110. If exceeding the maximum operational frequency, the processing module 104 restarts the operation of the switch process 70; if not exceeding the maximum operational frequency, the processing module 104 lowers the currently set operational frequency to restart the step 808.

Please refer to the switch process 70 and the first operation process 80, and the storage module 102 has stored the error range look-up table including the initial status S_IS of the inductive power supply system 60. In step 802, when the inductive power supply system 60 starts the setting operation, the resistors R1, R2 are utilized to process the voltage division operation for the stable voltage source VS, and the first division voltage value is transmitted to the processing module 104 after the voltage division operation. In step 804, the first division voltage value is transmitted by the processing module 104 to be stored in the storage module 102. In the embodiment, the first division voltage value is utilized to be one of the information headers of the error range look-up table for the following searching process. In step 806, the processing module 104 (or the control signal received by the switch module 600) can set the operational frequency corresponding to the first division voltage value as the maximum operational frequency (or a higher operational frequency) of the inductive power supply system 60. In step 808, the processing module 104 transmits the set operational frequency to the driving module 106 to generate the driving voltage S_DV, and accordingly, the capacitor C and the inductive coil 108 generate the sinusoidal wave S_DV2. In the meanwhile, the first detection unit 1110 of the feedback module 110 transforms the voltage value of the sinusoidal wave S_DV2 into the feedback signal S_FB, so as to be stored in the storage module 102 via the processing module 104. In step 810, the processing module 104 determines whether the feedback signal S_FB exceeds the maximum operational frequency of the feedback module 110 according to the voltage value of the sinusoidal wave S_DV2. If the feedback signal S_FB exceeds (or equals) the maximum operational frequency of the feedback module 110, the processing module 104 generates a terminal signal (not shown in the figure) to stop the setting operation, so as to restart the operation of the switch process 70; if the feedback signal S_FB does not exceed (or is lower than) the maximum operational frequency of the feedback module 110, the processing module 104 lowers the currently set operational frequency corresponding to the first division voltage value to restart the step 808, so as to record the voltage value of the sinusoidal wave corresponding to the following operational frequency.

After a plurality of the recorded voltage values corresponding to the different operational frequencies, the storage module 102 not only comprises the pre-written initial status S_IS of the inductive power supply system 60, but also dynamically records the sinusoidal curve corresponding to the current stable voltage source VS. Thus, the user can further input different stable voltage sources to obtain a plurality of amplitude curves to be stored inside the error range look-up table. In other words, the user can obtain the voltage values and the plurality of error ranges of the sinusoidal waves corresponding to different stable voltage sources and different operational frequencies, i.e. setting up the plurality of information headers and the related information thereof in the error range look-up table. Also, the user can adaptively add related parameters, such as the characteristics of the chargeable device, in the error range look-up table according to different users' requirements, so as to apply the adjusted initial status S_IS of the inductive power supply system 60 to the chargeable device at the particular stable voltage source VS.

Figure 9:
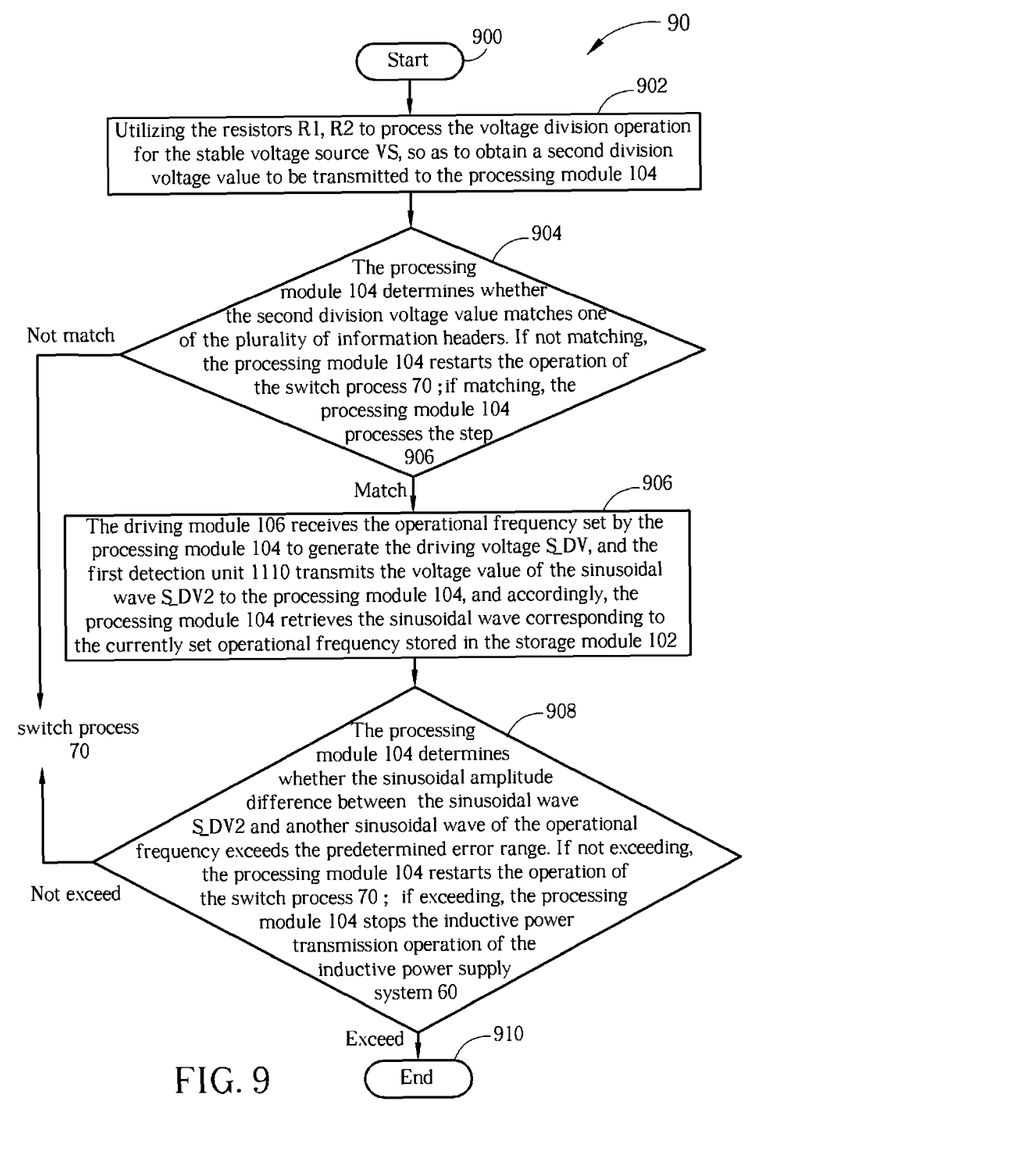
FIG. 9 illustrates a flow chart of a second operation process according to an embodiment of the invention.

In addition, details of the second operation process 90 in Step 704 can also be referenced in FIG. 9. The second operation process 90 includes the steps as follows.

Step 900: Start.

Step 902: Utilizing the resistors R1, R2 to process the voltage division operation for the stable voltage source VS, so as to obtain a second division voltage value to be transmitted to the processing module 104.

Step 904: The processing module 104 determines whether the second division voltage value matches one of the plurality of information headers. If not matching, the processing module 104 restarts the operation of the switch process 70; if matching, the processing module 104 processes the step 906.

Step 906: The driving module 106 receives the operational frequency set by the processing module 104 to generate the driving voltage S_DV, and the first detection unit 1110 transmits the voltage value of the sinusoidal wave S_DV2 to the processing module 104, and accordingly, the processing module 104 retrieves the sinusoidal wave corresponding to the currently set operational frequency stored in the storage module 102.

Step 908: The processing module 104 determines whether the sinusoidal amplitude difference between the sinusoidal wave S_DV2 and another sinusoidal wave of the operational frequency exceeds the predetermined error range. If not exceeding, the processing module 104 restarts the operation of the switch process 70; if exceeding, the processing module 104 stops the inductive power transmission operation of the inductive power supply system 60.

Step 910: End.

Please refer to the switch process 70 and the second operation process 90, and the storage module 102 has stored the adjusted error range look-up table. In step 902, when the inductive power supply system 60 starts the inductive power transmission operation, the resistors R1, R2 of the input power module 100 process the voltage division operation of the stable voltage source VS, and accordingly, the second division voltage value is transmitted to the processing module 104 after the voltage division operation. In step 904, the processing module 104 determines whether the second division voltage value matches one of the plurality of information headers. If the second division voltage value matches none of the plurality of information headers, the processing module 104 restarts the operation of the switch process 70; if the second division voltage value matches one of the plurality of information headers, the processing module 104 processes the step 906. In step 906, the driving module 106 receives the operational frequency set by the processing module 104 to generate the driving voltage S_DV, and the first detection unit 1110 transmits the voltage value of the sinusoidal wave S_DV2 to the processing module 104, such that the processing module 104 can retrieve the sinusoidal wave corresponding to the currently set operational frequency stored in the storage module 102, so as to process the following comparison. In step 908, the processing module 104 determines whether the sinusoidal amplitude difference between the sinusoidal wave S_DV2 and the sinusoidal wave of the operational frequency exceeds the predetermined error range. If the sinusoidal amplitude difference does not exceed the predetermined error range, the processing module 104 restarts the operation of the switch process 70; if the sinusoidal amplitude difference exceeds the predetermined error range, the processing module 104 generates another terminal signal (not shown in the figure) to stop the inductive power transmission operation of the inductive power supply system 60.

Furthermore, in step 908, when the processing module 104 determines the inductive power supply system 60 stops the inductive power transmission process, the indication module 602 correspondingly generates an indication signal (not shown in the figure), such as a voice signal or a light signal, to inform the user that there is the intruding metal inside the inductive power supply system 60 or the inductive power supply system 60 malfunctioned and needs a manual correction. Certainly, those skilled in the art can adaptively modify or add other indication mechanisms and circuits thereof, so as to render a display function via a display panel to notice the user where the breakdown elements are inside the inductive power supply system 60. Besides, those skilled in the art can also add other switch mechanisms/signals to correspondingly combine with the first/second operation process, so as to perform the additional switch mechanisms in front/back of the first/second operation process, which is also in the scope of the invention.

In the embodiment, the storage module 102 has pre-stored the initial status S_IS, i.e. the user has stored the related parameters inside the storage module 102 to be the initial error range look-up table, and the switch module 600 receives the control signal to adaptively operate the first operation process 80, such that the inductive power supply system 60 can be added with more error ranges and related setting of the receipt power end (e.g. different inductive coils match different capacitor-inductor matching curves) corresponding to different amplitude curves, different operational frequencies and different stable voltage sources while practical operating. Also, the user can adaptively modify the initial error range look-up table (i.e. the initial status S_IS) to comprise the practical measuring related information. Preferably, the invention does not restrict the operational mechanism of the wireless signal transmission, and those skilled in the art can input other control signals/processes during the setting operation and the inductive power transmission operation according to different requirements, so as to correspondingly determine whether or not the inductive power supply system 10 (60) simultaneously operates the inductive power transmission operation and the wireless signal transmission operation, which is also in the scope of the invention.

In summary, the invention provides an inductive power supply system and a detection method for an intruding metal, so as to simultaneously operate the inductive power transmission operation as well as detecting whether the intruding metal exists. In other words, the invention determines the difference between the sinusoidal amplitude of the feedback signal and the sinusoidal amplitude corresponding to the initial status of the inductive power supply system. When the difference exceeds the error range, the inductive power supply system stops the inductive power transmission operation to avoid the possible intruding metal entering into the interacting area of the inductive power supply system and the chargeable device, so as to avoid dangers of heating the intruding metal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An inductive power supply system, utilized for processing an inductive power transmission operation and detecting whether an intruding metal exists inside the inductive power supply system, comprising:
    an input power module for receiving a stable voltage source;
    a storage module for storing a predetermined information;
    a processing module coupled to the input power module and the storage module for generating a control signal according to the predetermined information and a feedback signal;
    a driving module coupled to the input power module and the processing module for transforming the stable voltage source into a driving voltage according to the control signal;
    an inductive coil coupled to the driving module for electrically transmitting the driving voltage to a receipt power device, so as to process the inductive power transmission operation; and
    a feedback module coupled to the inductive coil for generating the feedback signal according to the driving voltage received by the inductive coil;
    wherein the predetermined information represents an initial state of the inductive power supply system comprising a sinusoidal amplitude corresponding to the driving voltage, and the intruding metal can affect another sinusoidal amplitude of the feedback signal to make the processing module correspondingly generate the control signal during the inductive power transmission operation.

2. The inductive power supply system of claim 1, wherein the inductive coil is further coupled to a capacitor to render an effective capacitance and an effective inductance, and the initial state forms an amplitude curve on a two dimensional coordinate system comprising a plurality of operational frequencies as an X-axis and a plurality of sinusoidal amplitudes as a Y-axis according to the effective capacitance and the effective inductance.

3. The inductive power supply system of claim 2, wherein when the driving voltage increases, the amplitude curve shifts upward along the Y-axis within the two dimensional coordinate system and a maximum sinusoidal amplitude of the amplitude curve increases as well.

4. The inductive power supply system of claim 2, wherein when the effective capacitance and the effective inductance increase, a sinusoidal amplitude of the amplitude curve with a fixed operational frequency decreases, and when the effective capacitance and the effective inductance decrease, the sinusoidal amplitude of the amplitude curve with the fixed operational frequency increases.

5. The inductive power supply system of claim 2, wherein when the intruding metal is onto a projective plane of the inductive coil, the sinusoidal amplitude of the feedback signal increases at each of the operational frequencies.

6. The inductive power supply system of claim 5, wherein the storage module further comprises a programming code for determining whether a sinusoidal amplitude difference between the feedback signal and the predetermined information exceeds an error range.

7. The inductive power supply system of claim 6, wherein the storage module stores a look-up table comprising the plurality of operational frequencies, the plurality of sinusoidal amplitudes and a plurality of error ranges, wherein each of the plurality of error ranges corresponds to one of the plurality of operational frequencies and one of the plurality of sinusoidal amplitudes.

8. The inductive power supply system of claim 6, wherein when the sinusoidal amplitude difference between the feedback signal and the predetermined information exceeds the error range, the processing module generates a first terminal signal to make the inductive power supply system stop the inductive power transmission operation.

9. The inductive power supply system of claim 6, further comprising an indication module which generates an indication signal when the sinusoidal amplitude difference between the feedback signal and the predetermined information exceeds the error range.

10. The inductive power supply system of claim 1, further comprising a switch module for generating a switch signal to switch the processing module between a setting operation and the inductive power transmission operation.

11. The inductive power supply system of claim 10, wherein the storage module further comprises a programming code for comparing an operational voltage of the feedback signal and another operational voltage of the predetermined information.

12. The inductive power supply system of claim 11, wherein when the operational voltage of the feedback signal is larger than the operational voltage of the predetermined information, the processing module generates a second terminal signal to stop the setting operation.

13. The inductive power supply system of claim 1, wherein the storage module further comprises a non-volatile memory (NVRAM) to store the predetermined information and another programming code, which controls the processing module to obtain the initial state of the inductive power supply system via a frequency modulation process.

14. The inductive power supply system of claim 1, wherein the feedback module detects a sinusoidal amplitude difference to make the processing module process the inductive power transmission operation whether or not the inductive coil is electrically coupled to the receipt power device.

15. A method for an inductive power supply system, which comprises a processing module, an inductive coil and a predetermined information for processing an inductive power transmission operation and detecting whether an intruding metal exists inside the inductive power supply system, comprising:
  switching the inductive power supply system between a setting operation or the inductive power transmission operation according to a control signal; and
  when the inductive power supply system processes the setting operation, the processing module processes a first operation process, and when the inductive power supply system processes the inductive power transmission operation, the processing module processes a second operation process;
  wherein the predetermined information is an initial state of the inductive power supply system to be formed as a initial look-up table, the first operation process modifies the initial look-up table of the inductive power supply system to be formed as an adjusted look-up table, and the second operation process detects whether the intruding metal exists in the inductive power supply system according to the adjusted look-up table;
  wherein the first operation process further comprises:
    processing a voltage division operation for a stable voltage source to generate a first division voltage value;
    predetermining the first division voltage value as an information header added into the initial look-up table as the adjusted look-up table;
    setting an operational frequency of the processing module as a maximum operational frequency of the inductive power supply system according to the first division voltage value;
    transmitting the operational frequency to a driving module such that the driving module correspondingly generates a driving voltage to the inductive coil, and a feedback module transforms a voltage signal of the inductive coil into a feedback signal; and
    determining whether the voltage signal of the inductive coil exceeds a maximum operational frequency of the feedback module, and lowering the current operational frequency set by the processing module to obtain a plurality of information headers at different stable voltage sources if the voltage signal of the inductive coil does not exceed the maximum operational frequency of the feedback module so as to form the adjusted look-up table.

16. The method of claim 15, wherein the feedback module detects a sinusoidal amplitude difference to make the processing module process the inductive power transmission operation whether on not the inductive coil is electrically coupled to the receipt power device.

17. The method of claim 15, wherein the second operation process further comprises:
  processing the voltage division operation for the stable voltage source to generate a second division voltage value; and
  determining whether the second division voltage value matches one of the information headers in the adjusted look-up table so as to determine whether the second operation process is processed or finished.

18. The method of claim 17, wherein the second operation process further comprises:
  when the second operation process is processed, the driving module generates the driving voltage according to the current operational frequency of the processing module, and accordingly, the feedback module transforms the current voltage signal of the inductive coil into the feedback signal to the processing module;
  retrieving a sinusoidal amplitude corresponding to the operational frequency of the processing module from the adjusted look-up table; and
  determining whether a sinusoidal amplitude difference between the feedback signal and the operational frequency exceeds an error range, and when the sinusoidal amplitude difference exceeds the error range, the processing module determines that the intruding metal is inside the inductive power supply system so as to stop the inductive power transmission operation.

19. The method of claim 18, further comprising utilizing an indication module for generating an indication signal when the sinusoidal amplitude difference exceeds the error range.

20. The method of claim 15, further comprising utilizing a switch module for generating a switch signal so as to switch the inductive power supply system between the setting operation and the inductive power transmission operation.

21. The method of claim 15, wherein the first operation process and the second operation process are compiled to be a programming code stored in a storage module, and the processing module operates the programming code to process the first operation process and the second operation process.

22. The method of claim 21, wherein the storage module further comprises a non-volatile memory (NVRAM) for storing the programming code, the initial look-up table and the adjusted look-up table.

23. The method of claim 15, wherein the processing module further operates another programming code to obtain the initial state of the inductive power supply system via a frequency modulation process so as to form the initial look-up table.

\* \* \* \* \*